United States Patent
Kim et al.

(10) Patent No.: US 8,154,386 B2
(45) Date of Patent: Apr. 10, 2012

(54) RFID READER AND RFID SYSTEM

(75) Inventors: Nam Yun Kim, Seongnam-si (KR); Yong Hee Lee, Seoul (KR); Young Bin Cho, Yongin-si (KR); Jae Yeon Choi, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 1012 days.

(21) Appl. No.: 11/997,506

(22) PCT Filed: Nov. 3, 2006

(86) PCT No.: PCT/KR2006/004568
§ 371 (c)(1),
(2), (4) Date: Jan. 31, 2008

(87) PCT Pub. No.: WO2007/052973
PCT Pub. Date: May 10, 2007

(65) Prior Publication Data
US 2008/0278329 A1 Nov. 13, 2008

(30) Foreign Application Priority Data

Nov. 3, 2005 (KR) .................. 10-2005-0104838
Nov. 18, 2005 (KR) .................. 10-2005-0110624

(51) Int. Cl.
*H04B 5/02* (2006.01)
(52) U.S. Cl. ............... 340/10.1; 340/572.1; 455/41.1
(58) Field of Classification Search ............. 340/10.1, 340/10.3, 10.31, 10.4, 10.5, 572.1, 572.4, 340/572.7; 455/41.1, 41.2
See application file for complete search history.

(56) References Cited

U.S. PATENT DOCUMENTS

| | | | |
|---|---|---|---|
| 5,726,630 A * | 3/1998 | Marsh et al. | 340/10.2 |
| 5,745,049 A | 4/1998 | Akiyama et al. | |
| 6,324,211 B1 | 11/2001 | Ovard et al. | |
| 6,549,760 B1 | 4/2003 | Honma et al. | |
| 6,952,157 B1 | 10/2005 | Stewart et al. | |
| 2002/0175805 A9 * | 11/2002 | Armstrong et al. | 340/10.31 |
| 2005/0005676 A1 | 1/2005 | Crawley et al. | |
| 2005/0114326 A1 * | 5/2005 | Smith et al. | 707/3 |
| 2005/0162338 A1 * | 7/2005 | Ikeda et al. | 345/2.1 |
| 2005/0231327 A1 * | 10/2005 | Friedrich et al. | 340/10.2 |
| 2006/0089107 A1 * | 4/2006 | Domino et al. | 455/78 |
| 2006/0145855 A1 * | 7/2006 | Diorio et al. | 340/572.1 |
| 2007/0069888 A1 * | 3/2007 | Parameswar | 340/539.13 |
| 2007/0075834 A1 | 4/2007 | Armstrong et al. | |

FOREIGN PATENT DOCUMENTS

| | | |
|---|---|---|
| JP | 2002-271229 A | 9/2002 |
| JP | 2004-227315 A | 8/2004 |
| KR | 10-2002-0047542 A | 6/2002 |
| KR | 10-2004-0006551 A | 1/2004 |
| KR | 10-2004-0016075 A | 2/2004 |

OTHER PUBLICATIONS

Office Action dated Jul. 12, 2011 in Korean Application No. 10-2005-0011030, filed Feb. 5, 2005.

* cited by examiner

*Primary Examiner* — Nabil Syed
(74) *Attorney, Agent, or Firm* — Saliwanchik, Lloyd & Eisenschenk

(57) ABSTRACT

Provided are an RF reader and an RF system. The RF reader includes: a plurality of antennas; a path selector for selecting a transmit or receive path of an RF signal; an RF processor for processing the RF signal received through the transmit or receive path of the path selector; and a controller for controlling the path selector selecting a path.

6 Claims, 6 Drawing Sheets

| Tari | PARAMETER | SYMBOL | MIN | AVER. | MAX | UNIT |
|---|---|---|---|---|---|---|
| 6.25μs to 25μs | MODULATION DEPTH | (A-B)/A | 80 | 90 | 100 | % |
| | RF ENVELOPE RIPPLE | $M_h = M_l$ | 0 | | 0.05(A-B) | V/m |
| | RF ENVELOPE RISING TIME | $t_{r\,10-90\%}$ | 0 | | 0.33Tari | μs |
| | RF ENVELOPE FALLING TIME | $t_{f\,10-90\%}$ | 0 | | 0.33Tari | μs |
| | RF WIDTH | PW | MAX (0.265Tari,2) | | 0.525Tari | μs |

RFID READER AND RFID SYSTEM

TECHNICAL FIELD

The present invention relates to an RFID reader and an RFID system.

BACKGROUND ART

A Ubiquitous Sensor Network (USN) means attaching electronic tags to every required point, detecting the precise fundamental data of objects as well as nearby environment data such as temperature, humidity, pollution degree and crack data, connecting the data to network and managing the data. USN gives a computing or communicating function to all the objects to realize a ubiquitous environment to communicate at anytime, anywhere.

Such the USN grows from a Radio Frequency Identification (RFID) technology and develops into a network form by having a sensing function additionally.

The above RFID is a technology to receive and transmit data from an electronic tag attached to objects by using radio frequency.

An RFID system uses various frequency bands such as low frequency, high frequency, UHF, microwave, having different usages and practical uses respectively.

Among the bands, UHF is spreading over the whole field of living including distribution, logistics because it may transmit signals to the great distance.

FIG. 1 is a diagram showing the conventional RFID system.

Referring to FIG. 1, an RFID system 100 comprises an RFID reader 101 and an electronic tag 102. RFID reader 101 includes an internal or external antenna forming an electromagnetic field, that is, an RF field by diffusing an active signal. If the electronic tag 102 enters the RF field 105, the electronic tag 102 receives the active signal diffused by the antenna and transmits data stored at a tag to the RFID reader by using the received active signal. After this, the RFID reader 101 receives and analyzes the data transmitted by the electronic tag to acquire particular data on an object where the electronic tag is attached.

Also, the particular data acquired at the RFID reader 101 provides a base useful in distribution/logistics management such as distribution, fabrication, price fluctuations, marketing, etc.

Such RFID technology is expected to spread throughout various fields such as farming, medical service, aviation, distribution, logistics, manufacture, etc, according to a development of chip-manufacturing, minimization, wireless communication technology and various solution programs.

However, a propagation environment varies as factors such as location and velocity of the electronic tag in RFID reader's RF field, packing materials of tag-attached products (e.g. in case of pallet freight), etc. Differences of a data error rate, a stability or a read range arising from a variation of the propagation environment become a factor decreasing a recognition rate of an electronic tag and a reliability of an RFID system.

As above, technologies for improving a recognition rate of RFID reader by internal or external factors are under development.

DISCLOSURE OF INVENTION

Technical Problem

An embodiment of the present invention provides an RFID reader in which a plurality of antennas may be arrayed.

An embodiment of the present invention provides an RFID configured to isolate a transmit or receive path.

An embodiment of the present invention provides an electronic tag and an RFID reader configured to transmit RF signals modulated by various modulation types.

An embodiment of the present invention provides a passive electronic tag and an RFID reader and RFID system configured to transmit RF signals modulated by various modulation types.

Technical Solution

In an embodiment of the present invention, there is provided an RFID reader comprising: a plurality of antennas for transmitting or receiving an RF signal; a path selector for selecting a transmit or receive path of the RF signal; an RF processor for processing the RF signal sent to the transmit path or receive path of the path selector; and a controller for controlling a path selection of the path selector.

In an embodiment of the present invention, there is provided an RFID reader comprising: a phase shifter changing an input RF signal into a first and second RF signals with a first and second phases and modulating the RF signals according to data; a signal selector for selecting the first or second RF signal according to a modulation type; and a controller for controlling a signal output path and period of the phase shifter and signal selector.

In an embodiment of the present invention, there is provided RFID system, comprising one or more of passive electronic tags; and an RFID reader having a plurality of antennas and communicating with the electronic tag by different modulation types according to coding formats.

Advantageous Effects

An RFID reader and an RFID system according to the present invention may reduce an error rate of transmission and/or receipt and improve receive sensitivity by isolating a transmit or receive path of an RF signal in the RFID reader.

Also, by arraying a plurality of antennas in a single RFID reader, it is possible to decrease the size of the RFID reader and increase the read range.

Furthermore, the RFID reader and the RFID system may communicate with an electronic tag by using an RF signal modulated by various modulation types suitable for a coding format. As a result, the RFID reader and the RFID system may send a required power to the electronic tag without loss and communicate with the electronic tag stably.

BEST MODE FOR CARRYING OUT THE INVENTION

Hereinafter, preferred embodiments of the present invention will be described in detail with reference to accompanying drawings.

Figure 1:
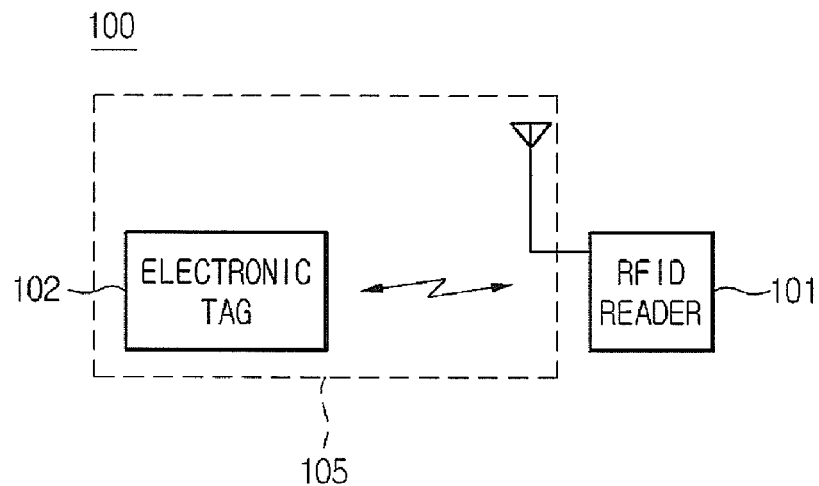
FIG. 1 is a structural diagram according to a conventional RFID system.
Figure 2:
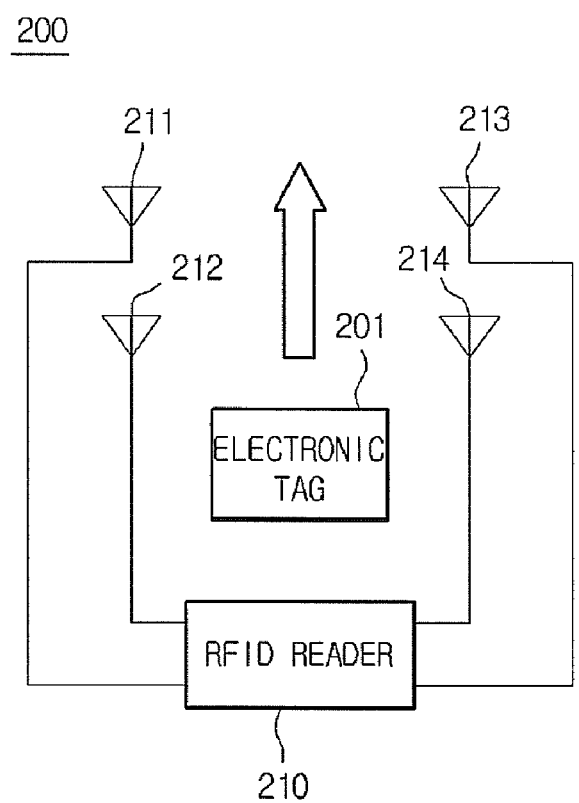
FIG. 2 is a structural diagram according to an embodiment of the present invention.

FIG. 2 is a structural diagram showing an RFID system 200 according to an embodiment of the present invention.

Referring to FIG. 2, the RFID system 200 comprises an electronic tag (called as a tag, a transponder or a label) 201, an RFID reader (called as a reader or an interrogator) 210 and a host computer (not shown) processing data read from the electronic tag 201.

The electronic tag 201 stores a data of an object, where the electronic tag 201 is printed onto or attached to. For example, the electronic tag may be manufactured in a speaker form and attached to each object passing through a logistics inspection area.

The RFID reader 210 communicates with one or more of electronic tags 201 wirelessly and performs a function to decipher and decode a particular data in the electronic tag 201.

The RFID reader 210 comprises a plurality of antennas 211-214, transmits an RF signal in order by using the plurality of antennas 211-214, and receives an RF signal from the electronic tag 201. Each antenna may be arrayed in a passing area of the electronic tag 201. For example, first and second antennas 211 and 212 perform communication at one (left) side of the area where the electronic tag 201 passes through and third and fourth antennas 213 and 214 perform communication at the other (right) side of the area where the electronic tag 201 passes through. Also, the first to the fourth antennas 211-214 may be arrayed with a radiation angle of an antenna different from those of the others.

Herein, the RFID reader 210 communicates with the electronic tag 201 through one of the antennas by controlling switching of the plurality of antennas 211-214 rapidly. Such an RFID reader 210 radiates a data request signal by using the plurality of antennas 211-214. Then, after receiving the data request signal, the electronic tag 201 creates a tag identification data and transmits the tag identification data to the RFID reader 210, which receives and recognizes the tag identification data.

Figure 3:
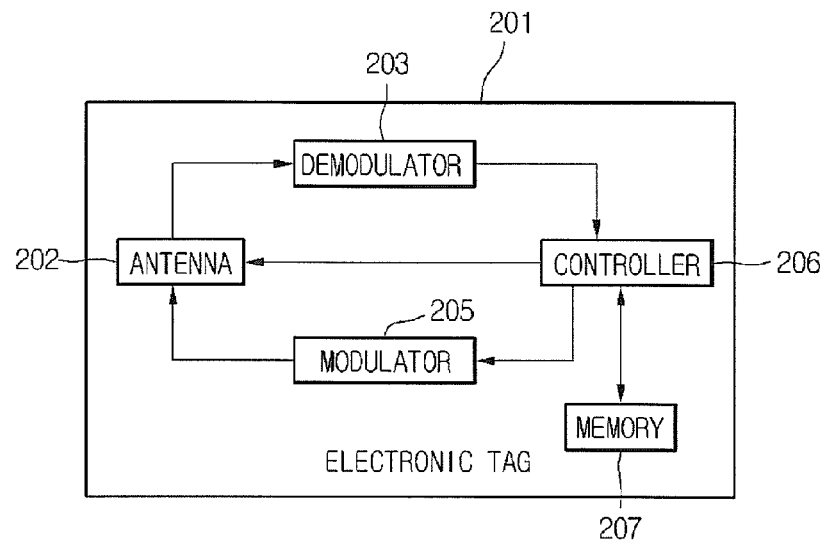
FIG. 3 is a detail structural diagram of an electronic tag according to the present invention.

FIG. 3 is a detail block diagram according to an embodiment of the present invention.

Referring to FIG. 3, the electronic tag 201 is classified as an active or passive type tag according to whether it has a built-in power supply and is used in various frequency bands such as low frequency (125 kHz, 135 kHz), high frequency (13.56 MHz), UHF (400 MHz-960 MHz), and microwave (2.45 GHz). Hereinafter, the passive type tag operating in UHF band will be explained.

The electronic tag 201 comprises an antenna 202, a demodulator 203, a modulator 205, a controller 206 and a memory 207. The antenna 202 may be embodied in a dipole antenna.

The demodulator 203, demodulating a data request signal received from the antenna 202, transmits the data request signal to the controller 206. Then, the controller 206 creates a tag identification data corresponding to the data request signal and performs a communication according to a communication protocol. The modulator 205 modulates and outputs the tag identification data through the antenna 202.

Such an electronic tag 201 receives a signal of the RFID reader and uses an RF power as a source of electric power by rectifying and/or multiplying the RF power. Also, the electronic tag 201 backscatter-modulates a received frequency signal from the RFID reader and transmits the modulated signal for the purpose of sending data.

The electronic tag 201 receives an RF signal modulated by using an RFID standard coding format such as a pulse-interval encoding (PIE) format or a Machester format type such as a double-sideband amplitude shift keying (DSB-ASK), a single-sideband amplitude shift keying (SSB-ASK) and a phase-reversal amplitude shift keying (PR-ASK) for the purpose of obtaining an energy for operating.

Figure 4:
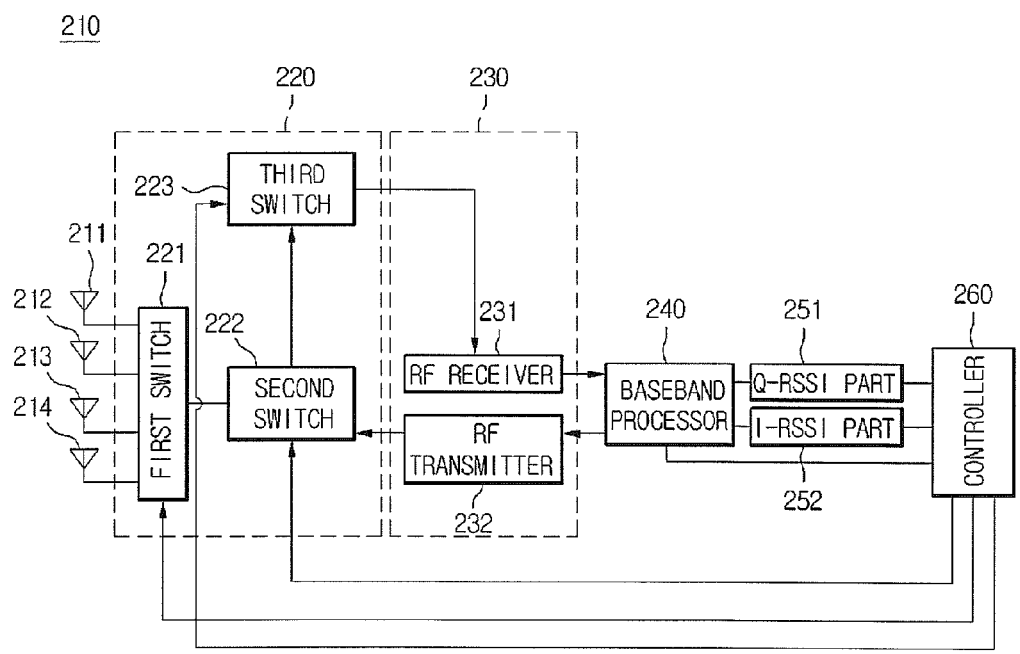
FIG. 4 is a block diagram of an RFID reader according to an embodiment of the present invention.

FIG. 4 is a detail block diagram according to an embodiment of the present invention.

Referring to FIG. 4, the RFID reader 210 comprises a plurality of antennas 211-214, a path selector 220, an RF processor 230, a baseband processor 240, a QRSSI part 251, an I-RSSI part 252, and a controller 260.

The path selector 220 comprises a first to a third switches 211,222,223, the first switch 221 connected to the plurality of antennas 211 to 214 transmitting or receiving an RF signal, the second switch 222 connected to the first switch 221 selecting a transmit or receive path. In transmit mode, the third switch 223 isolates a receive side from a transmit side to protect the receive side on circuitry. In receive mode, the third switch 223 establishes a receive path.

Herein, the first switch 221, by being connected to the plurality of antennas 211-214 in order or randomly and performing a fast switching operation of several switches per a second, may continuously monitor an area through which the electronic tag may move.

The first to the third switch 221,222,223 may be embodied in various forms, e.g., a semiconductor switch device such as single pole quadruple throw (SPQT) and a single pole double throw (SPDT) or a logic element such as a multiplex/demultiplex (MUX/DEMUX).

The RF processor 230 comprises an RF receiver 231 and an RF transmitter 232, the RF processor 230 performing a function to modulate and/or demodulate an RF signal.

In receive mode, after the RF receiver 231 squelches background noise of a signal received through the third switch 223 and amplifies a required band signal, the RF receiver 231 demodulates the signal and outputs the demodulated signal to the baseband processor 240.

The RF transmitter 232 modulates data inputted from the baseband processor 240 into an RF signal, amplifies the modulated RF signal to a transmit power, and outputs the amplified signal to the second switch 222.

The baseband processor 240 converts data demodulated in the RF receiver 231 into digital signal, or transmits an analog signal converted from a digital data to the RF transmitter 232.

A Q-RSSI (received signal strength indication) part 251 and I-RSSI part 252 is a circuit measuring Q (quadrature) and I (in-phase) signal strength, detecting and correcting an abnormal strength or irregularity of signal by interference noise or other noises.

The controller 260 comprises a communication protocol, controls an electronic tag and a wireless communication, and transmits a data request signal to the electronic tag periodically. Also, the controller 260 analyzes and extracts a tag identification data through digital data inputted from the baseband processor 240 and controls a transmission power of the RF transmitter, a modulation type, etc according to a strength of signal received from I-RSSI part 252 and Q-RSSI part 251.

Herein, a field programmable gate array (FPGA) or a digital signal processing (DSP) circuit may be used as the controller 260.

The controller 260 sends information on digital data or I/Q signal strength, etc to a host computer, which is transmitted from the baseband processor 240. Also, the controller 260 performs a transmission or receipt of an RF signal by controlling switching of the first to the third switch 221,222,223 according to whether transmit mode or receive mode.

Then, the controller 260, by performing a program reflecting data on a switching period and order, etc, sends out a control signal.

An operation of such an RF system will be more fully explained below.

With reference to FIG. 2 to 4, in an operation of an RFID reader, a controller 260 controls switching operation and connection period of the second and the third switch 222,223 according to whether a transmit mode or receive mode.

In transmit mode, the second and third switches of a path selector 220 are connected to transmit path. Then, the third switch 223, by isolating a receiving side from a transmitting side, prevents a transmission signal from flowing into the receiving side.

Also, the controller 260 delivers a data request signal to a baseband processor 240, the baseband processor 240 converting the data request signal into an analog signal and transmitting the analog signal to an RF transmitter 232. The RF transmitter 232 modulates an RF signal and amplifies the signal to a transmission level. The signal is emitted into one of the antennas through the second switch 221 and the first switch 222.

In receive mode, the second and third switches of a path selector 220 are connected to a receive path. Then, an RF signal of an electronic tag 201 is received at the first switch 221 through one of antennas and inputted into an RF receiver 231 along a receive path of the second switch 222 and the third switch 223.

And then, an RF receiver 231, after performing a low-noise amplification and demodulation of the RF signal, outputs the RF signal to a baseband processor 240. Also, the baseband processor 240 converts the demodulated signal into a digital data and outputs the digital data to an I-RSSI part 252, a Q-RSSI part 251 and a controller 260.

The I-RSSI part 252 and Q-RSSI part 251 measures a receive strength of an I/Q signal, transmitting it to the controller 260, and the controller 260 corrects an irregularity caused by interferences or noises by using the receive strength of the I/Q signal. Also, the controller 260 recognizes a digital data inputted from the baseband processor 240 as a tag identification data.

Figure 5:
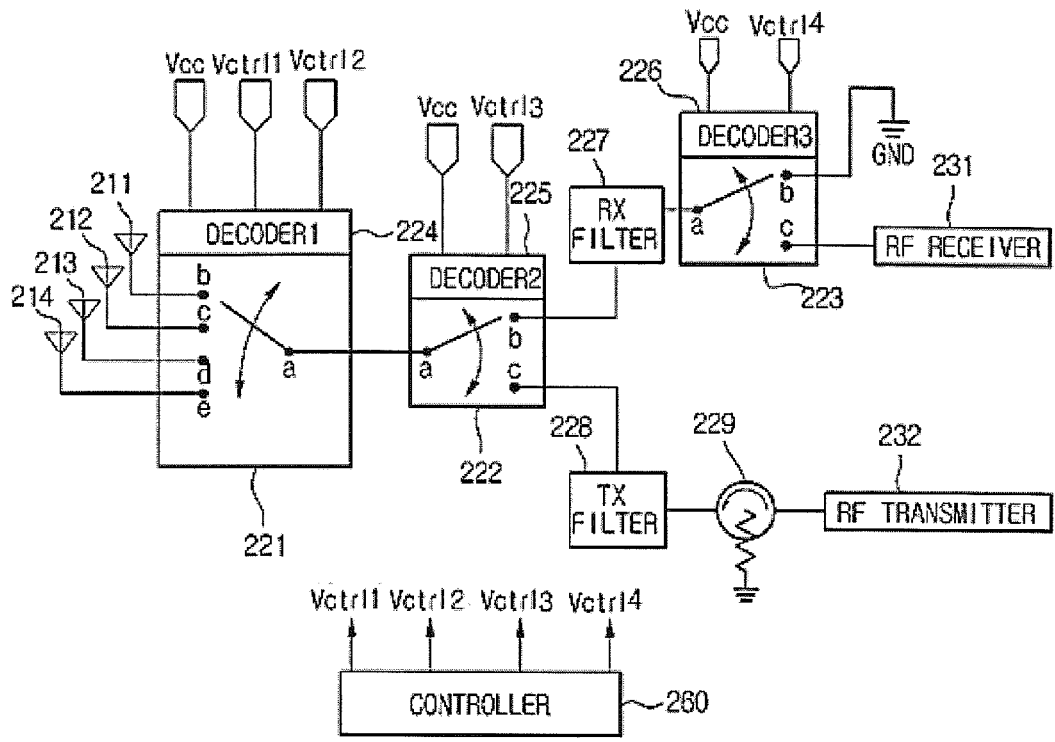
FIG. 5 is a block diagram showing an operation of a path selector of an RFID reader according to an embodiment of the present invention.

FIG. 5 is a detail block diagram according to an embodiment of the present invention.

Referring to FIG. 5, a first switch 221 is connected to four antenna terminals a:b-e according to a first and second control signal Vctrl1, Vctrl2 of a controller 260. The first and second control signal is inputted into the first decoder 224.

A second switch 222 is connected to a transmit terminal a-c or a receive terminal a-b according to a third control signal Vctrl3 of the controller 260. The third control signal is inputted into the second decoder 225.

The third switch 223 is connected to an earth terminal a-b or a receive terminal a-c according to a fourth control signal Vctrl4. The fourth control signal is inputted into the third decoder 226.

Herein, in a transmit mode, a high power signal (EIRP=4W) from an RF transmitter 232 is transmitted through the second switch 222, a portion of the transmitted signal (e.g. approximately 5 dBm) may flow into a receive path. At this time, the third switch 223, by being connected to GND, prevents the transmitted signal from flowing into the receiving terminal a-c. It can protect the receiving circuit. Also, the third switch 223 reduces an inflowing of a spurious wave component including the spurious signal due to an RF transmitting signal in the receive path in a process of converting a transmit mode to a receive mode. Hence, the third switch 223, by preventing level variation of a received signal inputted into the RF receiver, may recover a tag signal more precisely, having an effect of reducing a signal flowing into the receive path over 25 dB in a transmit mode.

Figure 7:
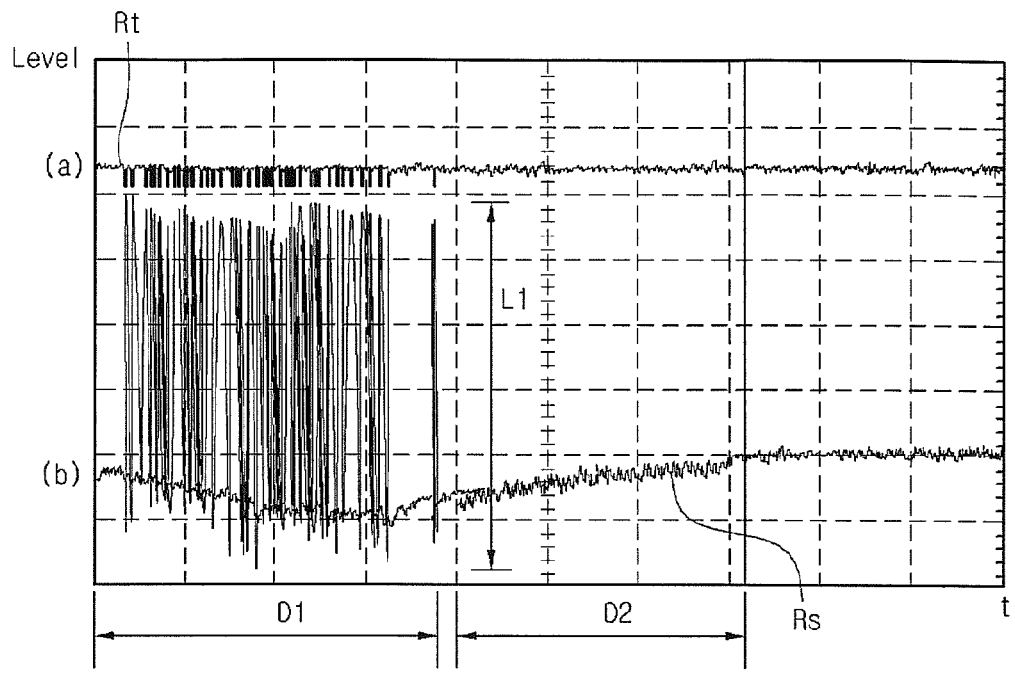
FIG. 7 is a waveform graph of a transmitted or received signal at a conventional RFID reader.
Figure 8:
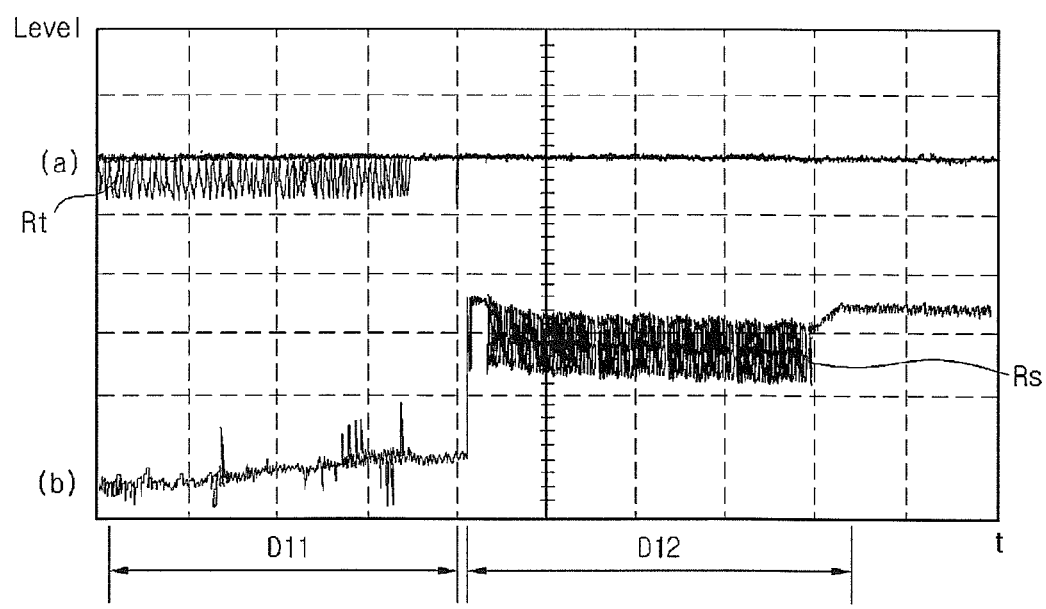
FIG. 8 is a waveform graph of a transmitted or received signal at an RFID reader according to the present invention.

FIG. 7 is a waveform graph of a transmitted (a) or received (b) signal in the conventional non-isolation between transmit and receive paths, and FIG. 8 is a waveform graph of a transmitted (a) or received (b) signal in isolation between transmit and receive paths according to the present invention.

Referring to FIG. 7, when an RF signal Rt is transmitted in a transmit section D1, a noise level of designated size L1 (approximately 3.2V) flows into a receive path. A transfer to a receive section D2 at this condition results that a level of a received tag signal Rs is unstably detected. Consequently, a tag recognition rate will decrease. The transmit and receive sections D1,D2 are switching maintenance time according the transmit or receive mode.

Referring to FIG. 8, when an RF signal Rt is transmitted in a transmit section D11, a signal inputted into a receive path flows into GND. Then, any noise hardly flows into the receive path. Also, in spite of a transfer to a receive section D12, a level of a tag signal Rs may be stably detected. Consequently, a tag recognition rate will increase. The transmit and receive sections D11,D12 are switching maintenance time in the transmit or receive mode.

As figured in FIG. 5, a receiving filter 227 may be included between the second switch 222 and the third switch 223. Also, a transmitting filter 228 may be included between the second switch 222 and the RF transmitter 232. Herein, the receiving and transmitting filters 227,228 may be embodied in a surface acoustic wave (SAW) filter, which removes a noise component of a signal. Also, an isolator 229 is connected to an output side of an RF transmitter 232. The isolator 229 may transmit a signal in transmitting direction without a loss, but blocks a reflection signal in reverse direction. Such an isolator may be installed on a receive path.

Figure 6:
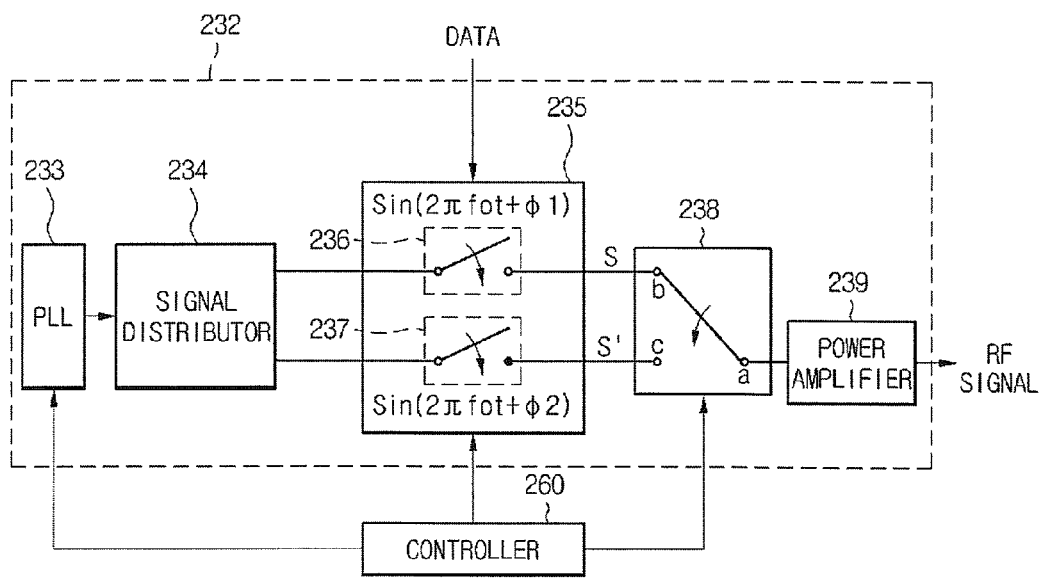
FIG. 6 is a block diagram showing an RF transmitter of an RFID reader according to an embodiment of the present invention.

FIG. 6 is a detail block diagram of an RF transmitter 232 according to an embodiment of the present invention.

Referring to FIG. 6, the RF transmitter 232 comprises a phase locked loop (PLL) 233, a signal distributor 234, a phase shifter 235, a signal selector 238 and a power amplifier 239.

When an RF signal is outputted from the PLL 233, the signal distributor 234 divides the RF signal into two paths, outputting the first and second RF signals.

The phase shifter 235 comprises the first and second phase shifter 236,237. The first and second phase shifter 236,237 shifts the first and second RF signals, resulting in 180 degree phase differential between the first and second RF signals. In other words, the first phase shifter 236 shifts a phase sin ($2\pi f_0 t$) of the RF signal by a first phase $\Phi1$, and the second phase shifter 237 shifts a phase sin($2\pi f_0 t$) of the RF signal by a second phase $\Phi2$. As a result, there is a 180 degree phase differential between the phases $\Phi1$, $\Phi2$ of the first and second RF signals S,S'.

Such a phase shifter 235 modulates a data inputted from a baseband processor into an RF signal, outputting the RF signal.

A signal selector 238 outputs one of two signals with a different phase selectively. The signal selector 238 may output an RF signal with a desired phase by being controlled by a controller 260. In other words, the signal selector 238 may output an RF signal modulated by a desired modulation type.

Then, a controller 260 controls a switching operation of the signal selector 238 connected to an output of the phase shifter 235. As a result, the signal selector 238 may obtains an RF signal modulated by one type among an RFID standard coding format such as a PIE format or a Machester format type such as a DSB-ASK, SSB-ASK and PR-ASK.

A power amplifier 239 amplifies a modulated RF signal to a transmit power and outputs the transmit power. An RFID transmitter 232 of the present invention may lead to one or more of the antennas of the RF reader.

Figure 9:
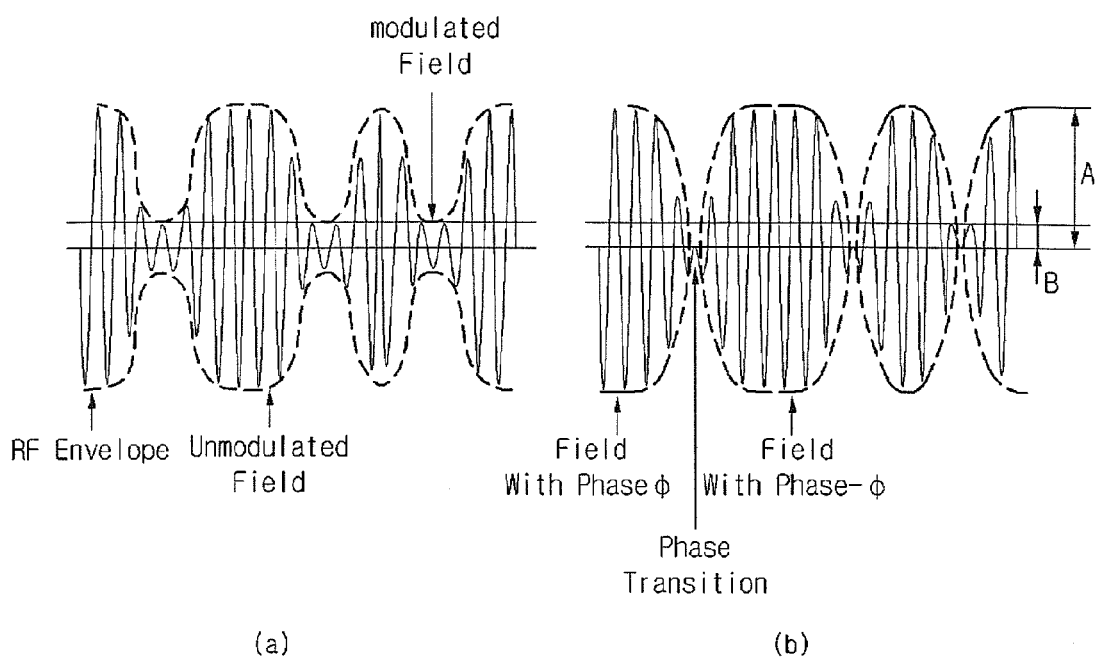
FIG. 9 is a waveform graph of signal modulated by an RFID reader according to the present invention, (a) showing an RF signal modulated by DSB or SSB-ASK modulation, and (b) showing an RF signal modulated by PR-ASK modulation.

FIG. 9a is a waveform graph showing an RF signal modulated by a DSB-SSB type and FIG. 9b is a waveform graph showing an RF signal modulated by a PR-ASK type. A degree of modulation about an RF signal modulated by the PR-ASK type may be obtained from (A−B)/A. Also, a phase $\Phi$ is a first phase $\Phi1$ of a first RF signal and a phase $-\Phi$ is a second phase $\Phi2$ of a second RF signal.

Herein, a format according to UHF RFID protocol such as ISO 18000-A, ISO 18000-B, ISO 18000-C, a electronic product code (EPC) Class 0 (EPC Generation-0), EPC Class 1 (EPC Generation-1, EPC Generation-2) may be applied. But, a coding format according to the generation-2 UHF RFID protocol may be used in an embodiment of the present invention. The Generation-2 of the EPC Class 1 may be applied to 18000-6, ISO formal standards.

Also, the controller 260 may control a switching period of a phase shifter 235 and a signal selector 238. Such a switching period is an interval corresponding to a response time of an electronic tag. For example, the switching period is configured within a pulse width (PW) section, that is, 0.265 Tari-0.525 Tari according to a PR-ASK modulation format.

As above, the present invention outputs selectively the first or second RF signal S or S' with the first or second phase from the phase shifter 235, modulates the RF signal by one of a coding format modulation types, and controls the pulse width of the modulated RF signal. As a result, the present invention may transmit a modulated signal of a different modulation type according to a coding format to the electronic tag 201.

Figure 10:
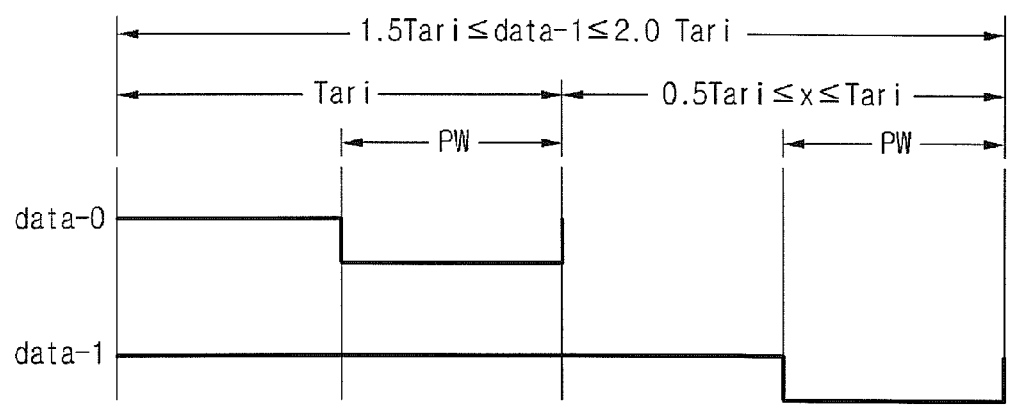
FIG. 10 is a view showing a PIE symbol at an RFID reader according to an embodiment of the present invention.

FIG. 10 is a view showing PIE symbols. Herein, a Tari means a reference time interval of a signal transmitted from an RFID reader to an electronic tag. Also, the Tari is duration of a data-0. An RFID reader performs a communication by using a Tari value from 6.25 μs to 25 μs. The Tari derives from an ISO/IEC 18000-6 standard.

Figures 11, 12:
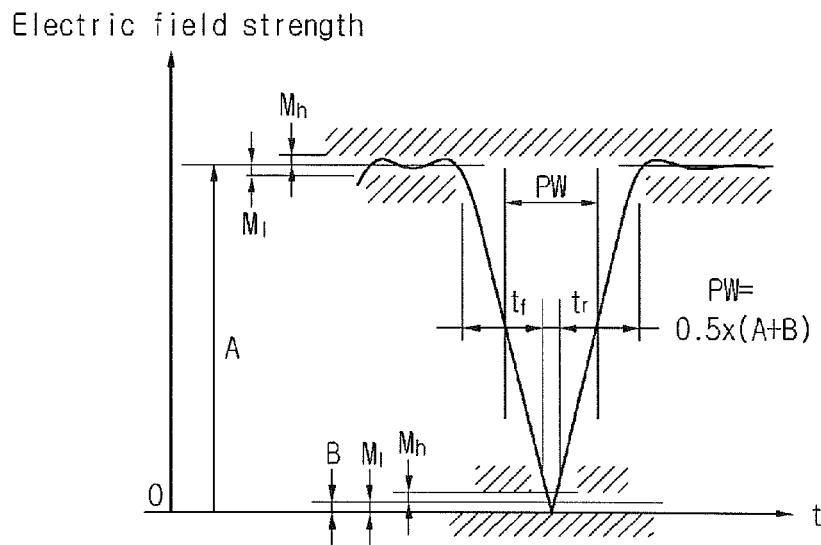
FIG. 11 is a graph showing an RF envelope modulated by PR-ASK modulation in an RFID reader.
FIG. 12 is a table showing parameters of the RF envelope in FIG. 11.

FIG. 11 is a graph magnifying a phase inversion section on an RF envelope according to the PR-ASK modulation type. A PW may be obtained from 0.5*(A+B). The pulse width is a pulse width of the RF envelope. Also, the pulse width is located around the half of an RF modulation signal pulse.

FIG. 12 is a table of parameters shown in FIG. 11, defining a pulse modulation degree, a rise time tr, a fall time tf and a pulse width PW.

Therefore, in a pulse width that is predetermined 0.265-0.525 Tari according to PR-ASK modulation format, a controller 260 of an RFID reader controls a switching of a phase shifter 235 and a signal selector 238 to output the modulated RF signal. Then, a response time of an electronic tag, that is, output condition of the phase shifter 235 and a signal selector 238 is maintained.

An RF transmitter 232 of an RF reader of the present invention controls a phase shifter 235 and a signal selector to output an RF signal modulated by one of modulation types such as a DSB-ASK, a SSB-ASK and PR-ASK. As a result, the present invention may transmit a power desired at an electronic tag without loss and communicate with the electronic tag stably.

An RFID reader according to the present invention may transmit an RF signal processed by various modulation types such as DSB-ASK, SSB-ASK and PR-ASK to an electronic tag. As a result, the present invention may transmit a power desired at an electronic tag without loss and communicate with the electronic tag stably.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The RFID reader and RFID system according to an embodiment of the present invention may have an effect of reducing error rate of transmitting and receiving data and increasing a receive sensitivity.

Also, in one RFID reader, a plurality of antennas for transmitting and receiving an RF signal are arranged. The size of the RFID reader can be reduced. And the recognition distance with the electronic tag can be increased.

Furthermore, the present invention may communicate with an electronic tag by using an RF signal modulated by various modulation types according to coding formats. As a result, the present invention may transmit a power desired at an electronic tag without loss and communicate with the electronic tag.

The invention claimed is:

1. A radio frequency identification reader comprising:
    a phase lock loop section generating an input radio frequency signal;
    a signal distributor receiving the input radio frequency signal from the phase lock loop and outputting a first radio frequency signal and a second radio frequency signal;
    a phase shifter receiving the first and second radio frequency signals from the signal distributor, creating a phase differential between a first phase of the first radio frequency signal and a second phase of the second radio frequency signal, and modulating the first and second radio frequency signals according to data received as input to the phase shifter;
    a signal selector for selecting one of the first and second radio frequency signals from the phase shifter as transmitting signal according to a modulation type; and a controller for controlling a signal output path and period of the phase shifter and signal selector.

2. The radio frequency identification reader according to claim 1, wherein the controller operates selectively based on one of DSB-ASK, SSB-ASK and PR-ASK modulation types.

3. The radio frequency identification reader according to claim 1, wherein the phase shifter adjusts the first and second radio frequency signals to create a 180 degree phase differential between the first and second phases of the two radio frequency signals.

4. The radio frequency identification system comprising:
one or more of passive electronic tags; and
a radio frequency identification reader having a plurality of antennas and communicating with the one or more passive electronic tags by different modulation types according to coding formats;
wherein the radio frequency identification, reader comprises:
a phase lock loop section generating an input radio frequency signal;
a signal distributor receiving the input radio frequency signal from the phase lock loop and outputting a first radio frequency signal and a second radio frequency signal;
a phase shifter receiving the first and second radio frequency signals from the signal distributor, creating a phase differential between a first phase of the first radio frequency signal and a second phase of the second radio frequency signal and modulating the first and second radio frequency signals according to data received as input to the phase shifter;
a signal selector for selecting one of the first and second radio frequency signal from the phase shifter as a transmitting signal according to a modulation type; and
a controller for controlling a signal output path and period of the phase shifter and signal selector.

5. The radio frequency identification system according to claim 4, wherein the radio frequency identification reader comprises a first switch connected on each of the antennas by a switching of the plurality of antennas, a second switch connected to the first switch for selecting the transmit or receive path of the radio frequency signal, and a third switch connecting a signal inputted through the second switch to a ground or the receive path according to a transmit or receive mode.

6. The radio frequency identification system according to claim 4, wherein the radio frequency identification reader comprises a radio frequency transmitter for outputting a radio frequency signal modulated selectively by one of DSB-ASK, SSB-ASK and PR-ASK modulation types.

* * * * *